United States Patent [19]

Clark, Jr. et al.

[11] Patent Number: 5,373,235
[45] Date of Patent: Dec. 13, 1994

[54] SYSTEM AND METHOD USING PORTABLE WALL ENGAGING FERROMAGNETIC PARTICLE IMPREGNATED TARGET MEDIUM FOR ELECTROMAGNETICALLY MEASURING DISTANCE BETWEEN OPOSING WALLS OF A STRUCTURE

[75] Inventors: William G. Clark, Jr., Murrysville Boro; Francis X. Gradich; Lee W. Burtner, both of Elizabeth Township, Allegheny County; Michael J. Metala, Murraysville, all of Pa.

[73] Assignee: Westinghouse Electric Corporation, Pittsburgh, Pa.

[21] Appl. No.: 38,214

[22] Filed: Mar. 29, 1993

Related U.S. Application Data

[62] Division of Ser. No. 662,664, Feb. 28, 1991, Pat. No. 5,200,704.

[51] Int. Cl.$^5$ .............................. G01B 7/10; G01B 7/14
[52] U.S. Cl. .............................. 324/207.16; 324/207.22; 324/229; 324/67
[58] Field of Search ............... 324/207.15, 207.16, 324/207.22, 207.26, 214–216, 229, 230, 231, 67

[56] References Cited

U.S. PATENT DOCUMENTS

| | | |
|---|---|---|
| 2,854,840 | 10/1958 | Anderson . |
| 2,895,851 | 7/1959 | Johnson .............................. 324/214 X |
| 3,249,860 | 5/1966 | Huggins .............................. 324/231 |
| 3,568,626 | 3/1971 | Southworth, Jr. . |

(List continued on next page.)

FOREIGN PATENT DOCUMENTS

| | | | |
|---|---|---|---|
| 2725816 | 12/1978 | Germany .............................. | 324/216 |
| 3106661 | 9/1982 | Germany . | |
| 0217304 | 1/1985 | Germany .............................. | 324/229 |
| 3435908 | 4/1986 | Germany .............................. | 324/230 |
| 0937996 | 6/1982 | U.S.S.R. .............................. | 324/229 |
| 1120157 | 10/1984 | U.S.S.R. .............................. | 324/229 |
| 1188520 | 10/1985 | U.S.S.R. .............................. | 324/229 |
| 1640526 | 4/1991 | U.S.S.R. .............................. | 324/229 |

OTHER PUBLICATIONS

Clark, Jr. et al.; "Tagged Adhesives for Improved Electromagnetic Inspection, Materials Evaluation", 48, Jan. 1990, pp. 60–64.

Magnetic Fluids, by R. E. Rosensweig, International Science and Technology, Jul. 1966, pp. 48–54.

*Primary Examiner*—Gerard R. Strecker

[57] ABSTRACT

Both a system and a method are provided which allows an eddy current probe to accurately determine both the proximity and dimensions of non-conductive structures which are normally invisible to such probes. The system comprises a portable target medium that is movable into a known position with respect to the non-conductive structure, and that includes a conductive material that couples strongly with a fluctuating magnetic field, and a movable eddy current probe that emanates a fluctuating magnetic field and which generates a signal indicative of the magnitude of the interaction between the field and the portable target medium from which the distance between the two may be computed. The system may be used to determine the proximity of non-conductive structures such as plastic pipes that have been buried under ground, as well as the dimensions of such non-conductive structures. When the system is applied to measure the dimensions of such a structure, the portable target medium assumes a form that is flexibly conformable to one of the walls of the structure and which is placed in abutting relationship thereto. The eddy current probe is then scanned against an opposing wall of the structure, whereby the width of the structure may be computed by measuring the strength of the interaction between the probe and the medium. In addition to measuring the dimensions of non-conductive structures, the system may be used to measure the dimensions of non-magnetic structures when the target medium includes a strongly magnetic material.

6 Claims, 4 Drawing Sheets

U.S. PATENT DOCUMENTS

| | | |
|---|---|---|
| 3,611,119 | 10/1971 | Madewell et al. . |
| 3,633,533 | 1/1972 | Allen et al. . |
| 3,792,458 | 2/1974 | Smith et al. ............... 324/514 X |
| 3,815,016 | 6/1974 | Nix et al. . |
| 4,210,864 | 7/1980 | Miyakawa et al. . |
| 4,623,282 | 11/1986 | Allen . |
| 4,700,486 | 10/1987 | Puumalainen . |
| 4,727,322 | 2/1988 | Lonchampt et al. . |
| 4,767,237 | 8/1988 | Cosman et al. . |
| 4,767,987 | 8/1988 | Montgomery . |
| 4,781,958 | 11/1988 | Gilbert . |
| 4,814,703 | 3/1989 | Carr et al. . |
| 4,847,552 | 7/1989 | Howard . |
| 4,855,677 | 8/1989 | Clark, Jr. et al. . |
| 4,859,943 | 8/1989 | Evans et al. ............... 324/216 |
| 4,870,359 | 9/1989 | Takahashi . |
| 4,937,995 | 7/1990 | Deffeyes et al. . |
| 4,944,135 | 7/1990 | Clark, Jr. et al. . |
| 5,006,806 | 4/1991 | Rippingale et al. . |
| 5,012,206 | 4/1991 | Tigges . |
| 5,017,869 | 5/1991 | Oliver . |

SYSTEM AND METHOD USING PORTABLE WALL ENGAGING FERROMAGNETIC PARTICLE IMPREGNATED TARGET MEDIUM FOR ELECTROMAGNETICALLY MEASURING DISTANCE BETWEEN OPOSING WALLS OF A STRUCTURE

This is a Divisional application of Ser. No. 07/662,664, filed Feb. 28, 1991 now U.S. Pat. No. 5,200,704.

BACKGROUND OF THE INVENTION

This invention generally relates to a system and method that enables an eddy current probe to determine the proximity of non-conductive structures, and the dimensions of both non-conductive and non-magnetic structures by the use of a portable target medium.

Eddy current probes for inspecting the condition of structures formed from conductive materials are well known in the prior art. Such probes generally comprise a sensor coil, a multi-frequency generator for conducting high frequency alternating current through the coil in order to generate a fluctuating electromagnetic field, and a circuit for measuring the amount of impedance experienced by an alternating current as it flows through the coil windings. When the sensor coil of such an eddy current probe is placed in the vicinity of a structure formed from a conductive material, the electromagnetic field emanated from the coil couples with the conductive material and induces a counter-flowing alternating magnetic field in the material. This counter-flowing magnetic field in turn induces eddy currents in the material. The counter-flowing electromagnetic field and eddy currents imposes an impedance on the electromagnetic field emanated by the sensor coil which may be precisely measured by the impedance measuring circuit of the probe. In some applications, the measured impedance applied to the sensor coil of the probe is used merely to detect the presence or absence of a particular conductive structure, such as the presence of metallic objects buried in the sands of a beach. In other applications, the measured impedance is used to detect the presence or absence of structural faults such as cracks, pits, or areas of wall thinning in a metal pipe or other conductive structure. In all applications, the impedance experienced by the fluctuating electromagnetic field emanated by the sensor coil measurably changes as the coil is scanned around the vicinity of a conductive structure, both as a function of the distance from the sensor coil to the structure, and as a function of physical variations in the structure, such as changes in wall thickness, the presence or absence of current-impeding cracks or other faults in the structure, or changes in the conductivity of the material used to form the structure. Because of the need in such areas as the nuclear engineering arts to be able to accurately and remotely inspect the structural integrity of reactor and steam generator components in hostile environments, a large body of sophisticated knowledge and expertise has been developed that is aimed at extracting detailed information about a metallic structure being scanned by an eddy current probe.

Unfortunately, eddy current probes cannot be used to detect or inspect structures formed from non-conductive materials, since the fluctuating electromagnetic field emanated by the coil sensor cannot couple with non-conductive materials. While there are alternate modes of inspection such as ultrasonic probes which do not require the structure being examined to be formed of electrically conductive materials, these alternate inspection modes are sometimes difficult if not impossible to implement. For example, the use of ultrasonic inspection probes requires the presence of a liquid couplant, such as water, between the probe head and the structure being inspected. In certain applications, such as the inspection of remote components of electrodynamic machinery, it may be highly undesirable, if not impossible, to provide such a liquid couplant around the structure. Moreover, even in instances where the nature of the structure or its accessibility or its environment does not pose a major obstruction to the application of a liquid couplant around the structure, there are some non-conductive structural materials that are inherently uninspectable by ultrasonic probes, such as porous ceramics. Any such liquid couplant would penetrate and be retained by the porous nature of such ceramics. Thus, there is no known satisfactory technique for inspecting the walls or measuring the wall thicknesses of the small diameter, thin walled porous ceramic tubing used for fuel cell and gas filtering applications.

Additionally, even in the case of structures which are conductive but not formed of non-magnetic materials, there are instances where neither eddy current nor ultrasonic inspections are capable of accurately determining the dimensions of such structures. For example, in assessing the wall thickness variations in the Zircaloy ® guide tubes used in nuclear fuel assemblies, it is possible for an eddy current probe to yield inaccurate results due to differences in conductivity along the length of the tube caused by differences in the orientation of the zirconium crystals. Additionally, an ultrasonic probe is not satisfactorily accurate across the ten foot length of such tubes because the axial taper present within the small diameter of such tubes (which have an outer diameter of only about 0.50 inches) prevents sufficient control of the interrogating sound beam.

Clearly, both a system and method are needed for both detecting the presence and for measuring the dimensions of remotely-located structures formed from non-conductive materials which is as accurate and reliable as the state-of-the art eddy current probe inspections made of structures formed from conductive materials. Ideally, a system and method would allow such inspections to be performed easily, cheaply, and remotely and would make maximum use of commercially available inspection equipment. Finally, it would be desirable if such a system and method were capable of accurately measuring the dimensions of any structure made from any non-conductive or non-magnetic material, and in particular structures formed from non-conductive or non-magnetic materials where an ultrasonic or eddy current probe is either incapable of achieving accurate results, or highly undesirable or impossible to apply.

SUMMARY OF THE INVENTION

The invention is both a system and method for determining both the proximity and dimensions of a non-conductive structure that advantageously utilizes eddy current probe technology. The system comprises a portable target medium that is movable into a known position with respect to the structure, wherein the medium includes a conductive material that couples with a fluctuating magnetic field, and a movable eddy current probe for emanating such a fluctuating magnetic field and for generating a signal indicative of the distance between the target medium and the probe so that the position of the structure relative to the probe can be determined.

The system and method are particularly useful in informing a system operator as to the position of a non-conductive structure, such as a plastic pipe, that has been buried in the ground. In such an application, the portable target medium is preferably in the form of a flexible sheet material that has been buried along with the pipe in a position adjacent to one of the pipe walls. In the preferred embodiment, the sheet material is a strip of polyethylene that has been impregnated with a substance which strongly couples with a fluctuating magnetic field, such as particles of a ferromagnetic material. To enhance the magnitude of the coupling between the ferromagnetic particles in the film and the fluctuating electromagnetic field emanated by the eddy current probe, the polyethylene film is shaped into rectangular strips which are horizontally oriented above their respective pipes in a parallel relationship. These strips of polyethylene film preferably include a plurality of drain apertures so that the film does not impede drainage to the ground, and is further preferably color coded to indicate one or more of the characteristics of the pipe, i.e., pipe diameter, pipe material, or the type of liquid being conducted by the pipe.

Alternatively, the system of the invention may be used to determine one or more of the dimensions of such a non-conductive structure, as for example the diameter of a piece of plastic or ceramic tubing. In this particular application of the invention, the portable target medium is preferably conformable to one of the walls of the structure. In operation, the eddy current probe is positioned against an opposing wall of the structure and actuated. The magnitude of the electromagnetic interaction between the probe and the target medium is then measured, which in turn may be used to compute the distance between the probe and the target medium.

The target medium may be a flexible strip of sheet material which is flexibly conformable to the contours to one of the walls of the structure whose dimensions are being measured. In this embodiment of the system, the target medium may have adhesive on one side for temporarily securing the medium into conforming contact with one of the walls of the structure. Alternatively, the target medium may be a bladder filled with a liquid that strongly interacts with the fluctuating electromagnetic field emanated by the eddy current probe, such as ferrofluid (which is an aqueous solution of colloidally-suspended ferromagnetic particles), or mercury. The target medium may also assume the form of a paint which when dripped on a non-conductive structure leaves a film on one of its side walls that strongly interacts with the fluctuating field emanated by an eddy current probe.

In the method of the invention, the magnitude of the interaction between the eddy current probe and the target medium is first measured for a plurality of different distances in order to calibrate the probe. Next, the target medium is placed into a known spatial relationship with respect to the non-conductive structure. If the method is being used merely to detect the proximity of underground, non-conductive pipes, the target medium may assume a strip-like form as previously described that is buried a known distance above the pipes in parallel relationship. If the method is being used to measure one or more dimensions of a non-conductive structure, then the target medium may be secured in abutting relationship to one of the walls of the structure.

In the next step of the method, the eddy current probe is scanned around the vicinity of the structure and points of maximum interaction between the electromagnetic field and the target medium are taken note of. Where the method used is to locate underground pipes, the position of the probe upon such maximum interaction should be directly above the pipe being located. Where the method is being used to measure a dimension of a structure, such maximum interaction occurs when the probe is abutted against an opposite wall of the structure, and the distance between the probe and the target medium is at a minimum. The magnitude of the electromagnetic interaction between the eddy current probe and the target medium is then measured, whereupon the distance between the probe and the target medium is determined. In the case where the method is being used to determine the proximity of buried pipe, this last step informs the operator as to how deep the pipe is being buried. Alternatively, where the method is being used to measure a dimension of a non-conductive structure, this last step precisely informs the system operator of the distance between two opposing walls of the structure.

Both the system and method of the invention advantageously enables sophisticated and accurate eddy current probes to be used to detect the presence of non-conductive structures which are normally "invisible" to such probes. Additionally, both the system and the method of the invention may be used to accurately measure either non-conductive structures, or non-magnetic structures whose material properties make it impossible to make such measurements with standard eddy current or ultrasonic probes.

DETAILED DESCRIPTION OF THE PREFERRED EMBODIMENTS

Figure 1:
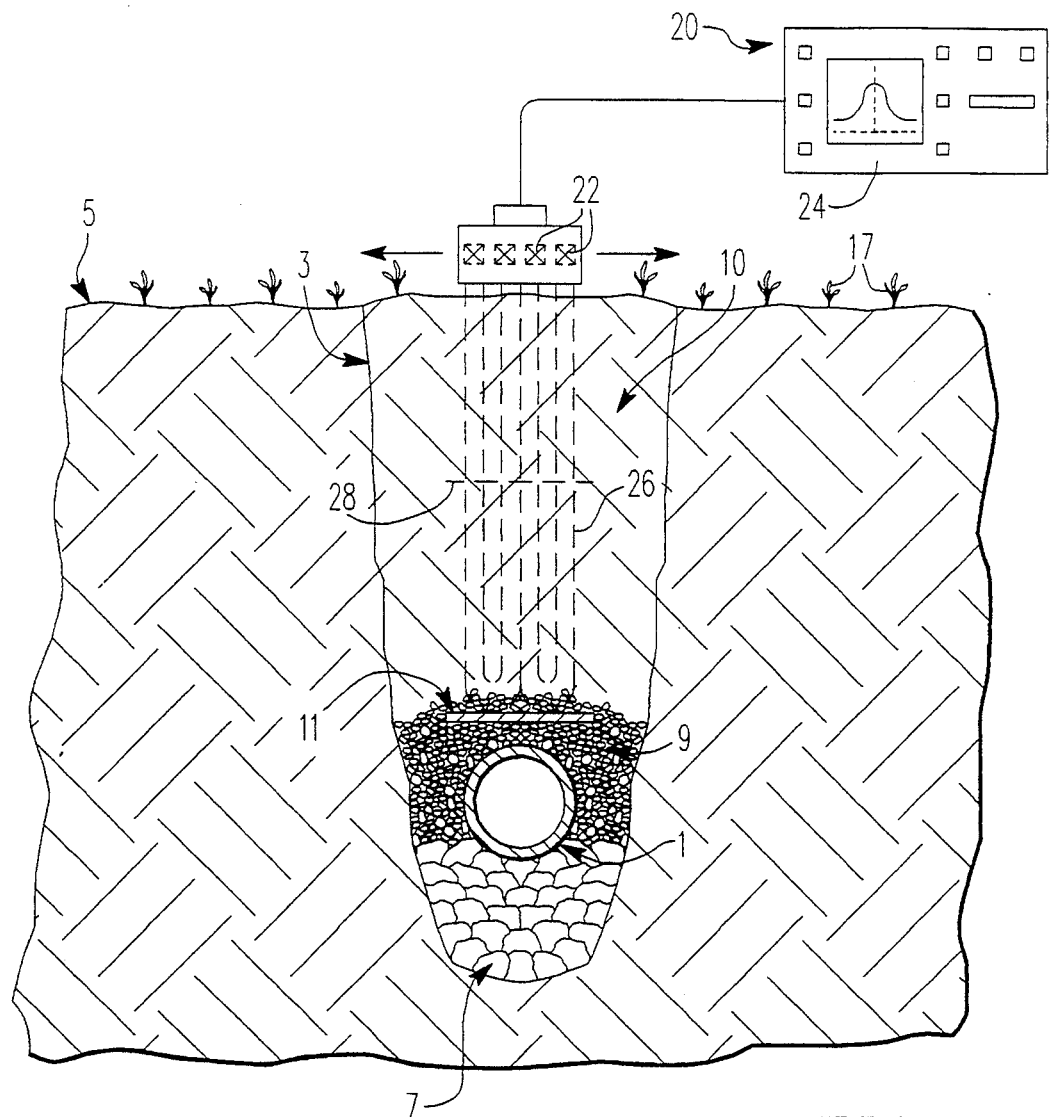
FIG. 1 illustrates how the system and method of the invention may be used to determine the proximity of a plastic pipe by means of an eddy current probe assembly, and a strip-like target medium buried directly above the plastic pipe.
Figure 2:
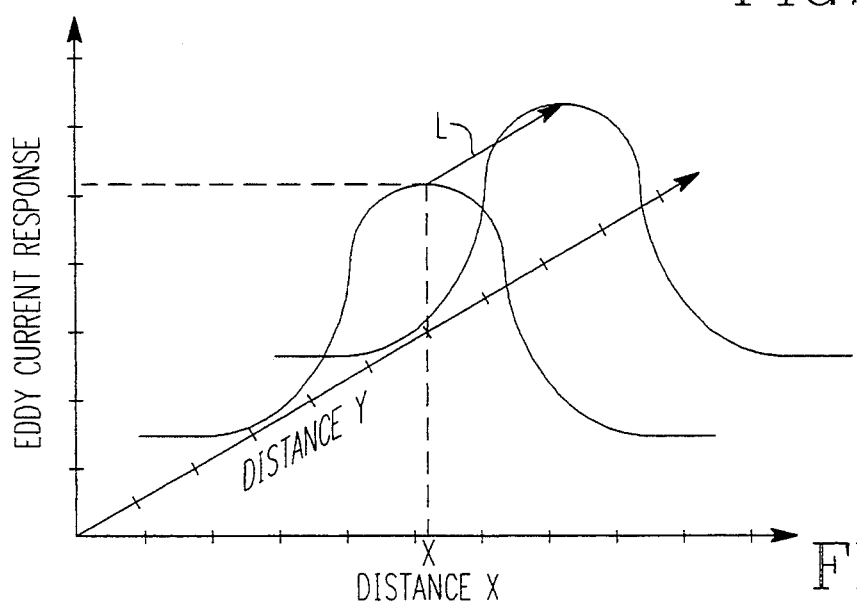
FIG. 2 is a graph illustrating how the response of the eddy current probe assembly increases as the probe coil of the assembly is placed closer into a position directly over the strip-like target medium illustrated in FIG. 1.

FIGS. 1 and 2 illustrate how both the system and the method may be used to determine the proximity of a non-metallic structure such as the polyvinyl chloride pipes that are used more and more frequently to transport water, gas and oil. During the initial installation of such plastic pipes 1, a trench 3 of a desired depth is first dug in the ground 5. Next, coarse gravel 7 is placed at the bottom of the trench to provide a support bed for the pipe 1 that is capable of draining water to the surrounding ground 5. After the pipe 1 has been laid, it is next surrounded by a layer of medium to fine gravel 9 again for the purpose of facilitating drainage. In the prior art, the layer of medium to fine gravel 9 was covered with ground filler 10, and vegetation 17 was allowed to grow all around the area of the trench 3 which made it difficult, if not impossible to precisely locate the plastic pipe 1 in the event that a repair had to be made. However, in the instant invention, a target medium 11 in the form of a polyethylene strip 13 impregnated with ferromagnetic particles is horizontally positioned over the layer of medium and fine gravel 9 prior to the final burial to the pipe 1 under the ground filler 10. This target medium 11 forms one of the two major components of the system of the invention. The other major component of the system is an eddy current probe assembly 20 having at least one probe coil 22 which is electrically connected to a multifrequency generator 24. In the preferred embodiment, the probe coil 22 is actually a plurality of concentrically arranged coils, each of which is independently connected to the multifrequency generator 24. As is specifically described in U.S. Pat. No. 4,855,677 by William G. Clark, Jr. et al., and assigned to the Westinghouse Electric Corporation, the provision of a plurality of concentrically arranged, and independently connected eddy current coils allows the system operator to extract more detailed information from the readings obtained from the multifrequency generator 20, and the text of this patent is hereby expressly incorporated herein by reference. The multifrequency generator 24 includes circuits for both applying a multitude of high frequency, alternating voltages to the coils contained within the probe coil 22 of the system, as well as an impedance measuring circuit for measuring the extent to which the lines 26 of flux emanated by the probe coil 22 interact with the target medium. In the preferred embodiment, the multifrequency generator 24 is a MIZ-18 multifrequency generator manufactured by Zetec located is Isaquah, Wash.

Figure 3:
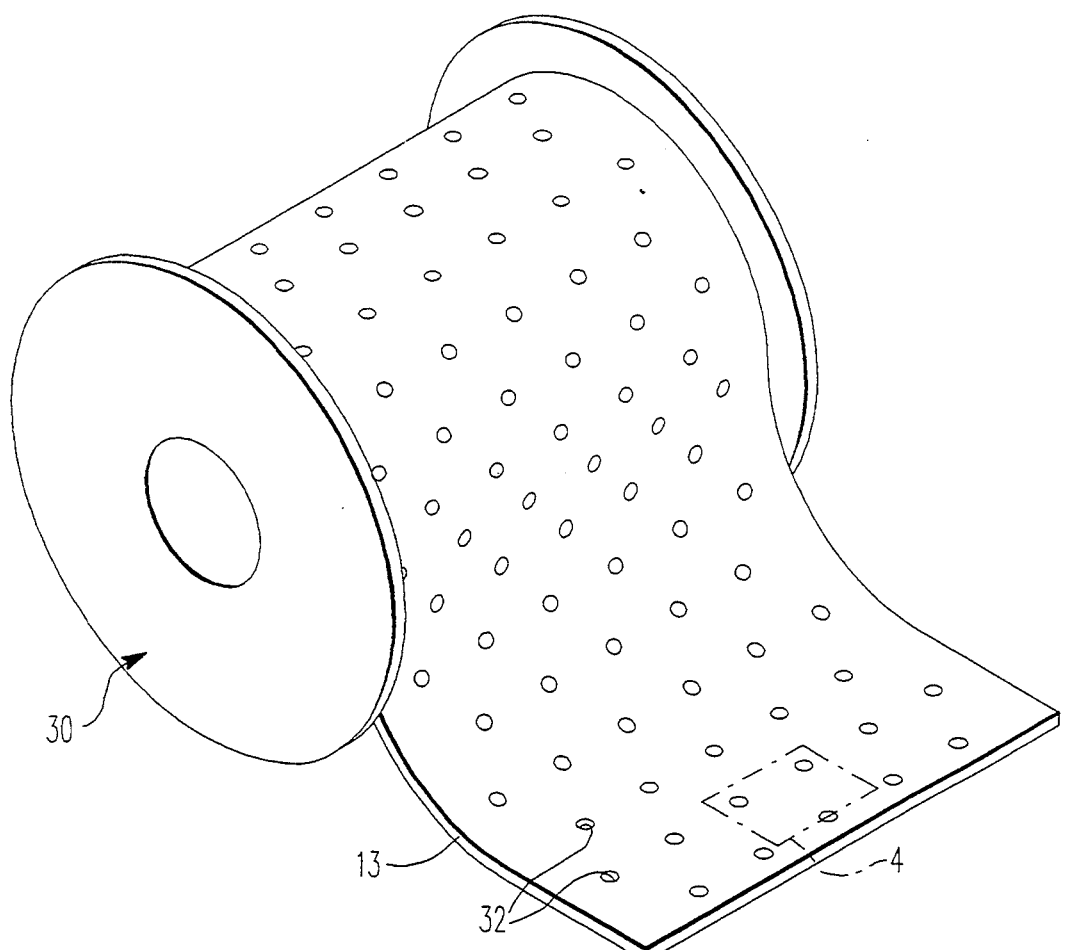
FIG. 3 is a perspective view of a target medium which may be used to implement the embodiment of the system and method of the invention illustrated in FIG. 1.
Figure 4:
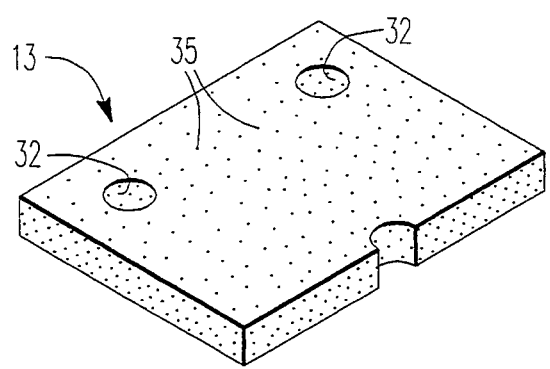
FIG. 4 is an enlarged view of the section of the strip illustrated in FIG. 3 surrounded by dotted lines, illustrating both the drain apertures and the particulate ferromagnetic material that are present in this strip-like target medium.

With reference now to FIGS. 3 and 4, the polyethylene strip 13 which forms the target medium 11 in this particular embodiment of the system of the invention may be supported on a spool 30 prior to being dispensed into the planar position illustrated in FIG. 1. A plurality of drain apertures 32 are provided within the polyethylene strip 13 so that water may freely pass through the strip 13 and on down through the layer of medium and fine gravel 9, through the coarse gravel 7, and ultimately into the surrounding ground 5. As is schematically indicated in FIG. 4, this polyethylene strip 13 is impregnated with ferromagnetic particles 35 which interact strongly with the fluctuating magnetic flux 26 emanated by the probe coil 22 of the eddy current probe assembly 20. To render the polyethylene strip 13 easily detectable by the eddy current probe assembly 20 without significantly interfering with the structural integrity of the surrounding polyethylene, the strip 13 preferably comprises between 0.5 and 10 percent of ferromagnetic particles by weight, and more preferably between 1 and 3 percent ferromagnetic particles by weight. While not specifically indicated in any of the several figures, the polyethylene strip 13 is preferably also color coded with one or more bright stripes of bars of color to indicate various structural characteristics of the pipe (i.e. , diameter, wall contents, depth of entrenchment, and fluid material conducted ) .

The first embodiment of the method of the invention may be best be understood with reference to FIGS. 1, 2 and 3. In the first step of this method, a target medium 11 in the form of the previously described polyethylene strip 13 is unreeled from the spool 30 prior to the final burial of the plastic pipe 1 underneath the ground filler 10 and laid in the horizontal position illustrated in FIG. 1 directly above the pipe 1 and all along its length. Next, after vegetation 17 has grown up all along the surrounding area so that it is difficult if not impossible to locate the borders of the trench 3 which holds the pipe 1, the probe coil 22 of an eddy current probe assembly 20 is actuated and scanned around the vicinity of the plastic pipe 1. During the scanning step, the system operator is careful to note the points at which the response of the impedance-sensing circuit within the multifrequency generator 24 registers its maximum output. At the registration of such an output, the probe coil 22 of the eddy current probe assembly 20 should be directly over the strip-like target medium 11, and hence directly over the plastic pipe 1 itself. In the final steps of this method, the system operator continues to scanningly move the probe coil 22 of the eddy current probe assembly 20 in order to determine the orientation of the pipe. Of course, pipe 1 will be oriented along the line L that corresponds to the maximum response of the eddy current probe assembly 20 (see FIG. 2). The location of this line L is marked by fluorescent road cones, or surveyor's markers or the like in order to provide a record of the location of the underground target medium 11, and hence the underground plastic pipe 1.

Figure 5:
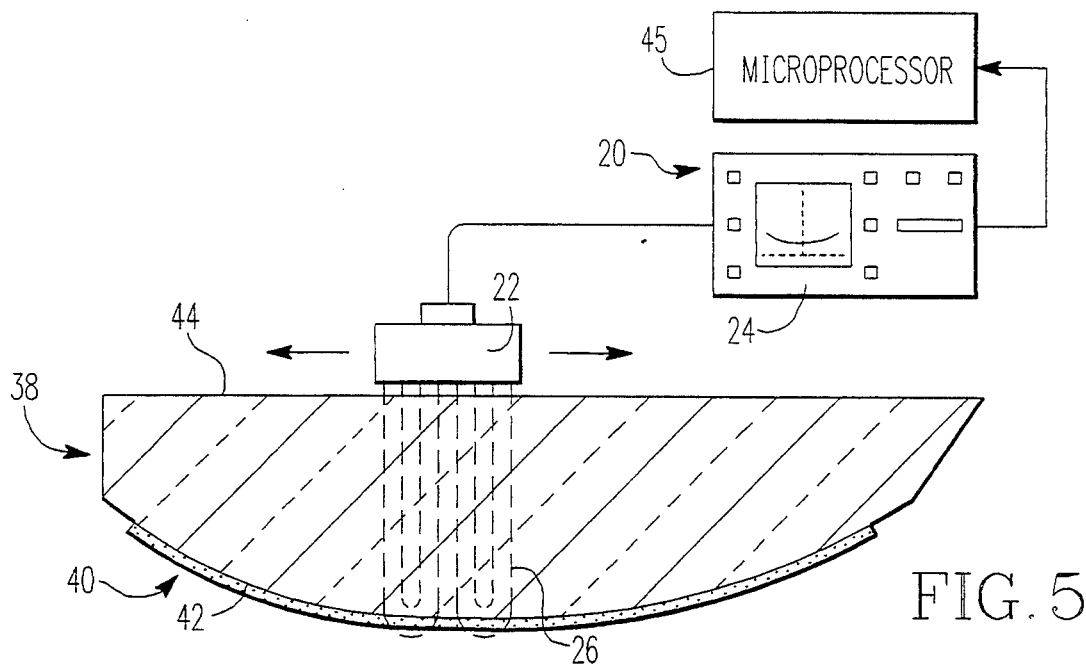
FIG. 5 schematically illustrates how the system and method of the invention may utilize the combination of an eddy current probe assembly, and a target medium that is conformable to the contours of one of the walls of a non-conductive structure in order to measure the thickness of this structure.
Figure 6:
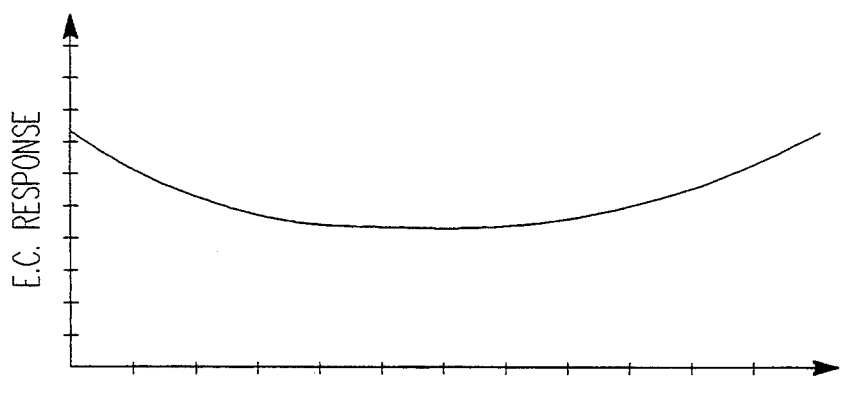
FIG. 6 is a graph illustrating how the magnitude of the response of the eddy current probe assembly changes as a function of the distance between the probe coil of the assembly and the conformable target medium applied over one of the wall of the structure.

FIGS. 5 and 6 illustrate how the system and method of the invention may be used to measure the dimensions of a non-conductive structure 38. In this embodiment of the system of the invention, the target medium 40 is formed from a material which is conformable to at least one of the walls 42 of the non-conductive structure 38. In implementing this particular embodiment of the method of the invention, the probe coil 22 of an eddy current probe assembly 20 as previously described is abutted against and scanned over an opposing wall 44 of the non-conductive structure. However, the output of the multi frequency generator 24 is conducted to a microprocessor 45 as shown. The conductive eddy current probe assembly 20 and microprocessor 45 used in this embodiment of the system is preferably a Model KD-4000 measuring displacement system manufactured by Kaman Instrumentation ( Industrial Products Division) located in Colorado Springs, Colo.

The method of the invention implemented by this particular embodiment of the system of the invention may be best understood with reference to both FIGS. 5 and 6. In the first step of this method, the eddy current probe assembly 20 is calibrated by moving it in the vicinity of a target medium 11 which is electromagnetically identical to the specific, conformable target medium 40 that has been applied to one of the walls 42 of the non-conductive structure 38. The specific magnitude of the response of the eddy current probe assembly 20 at specific distances between the probe coil 22 and sample target medium are recorded and entered into the memory of the microprocessor 45. Next, the eddy current probe assembly 20 is actuated, and the probe coil 22 is scanned over an opposing wall 44 of the non-conductive structure 38 as is schematically illustrated in FIG. 5. The interaction between the fluctuating lines 26 of magnetic flux, and the conformable target medium 40 is recorded for each particular spatial axis (of which only the x axis is shown in FIG. 6 for simplicity). The magnitude of this response for each point along each of the spatial axes on the opposing wall 44 is recorded by the microprocessor 45. Finally, the microprocessor 45 compares the magnitude of these responses with the magnitude of the responses entered into its memory in the initial calibration step, and generates a graph such as that illustrated in FIG. 6 which not only informs the operator as to the shape of the non-conductive structure 38 along a particular axis, but also the absolute thickness of the structure 38 at all points along this axis. Of course, the absolute thickness of the structure 38 at all points over the area of the opposing wall 44 may be determined by making multiple, side-by-side scans over the wall 44 with the probe coil 22.

Figure 7A:
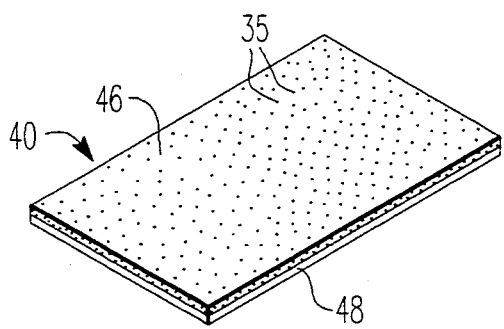
FIG. 7A is a perspective view of one of the embodiments of the conformable target medium of the system of the invention which is formed from a flexible sheet material impregnated with ferromagnetic particles in combination with an adhesive layer for detachably securing the target medium over one of the walls of the structure being measured.
Figure 7B:
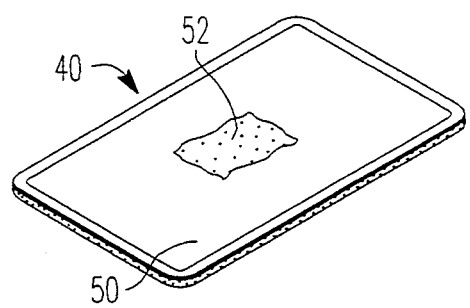
FIG. 7B illustrates an alternate embodiment of the conformable target medium used in the system of the invention which is formed from a flat, thin-walled bladder that has been filled with a liquid which strongly interacts with the fluctuating electromagnetic field emanated by the eddy current probe assembly.

FIG. 7A and 7B illustrate two of the numerous forms that the conformable target medium 40 used in this particular embodiment of the system and method of the invention may take. In FIG. 7A, the conformable target medium 40 is formed from a flexible sheet material 46 that has been impregnated with particles of a ferromagnetic material in the same range of concentrations as was previously discussed with respect to the polyethylene strip 13 illustrated in FIGS. 3 and 4. Additionally, this flexible sheet material 46 includes a layer 48 of adhesive on one of its sides to allow this particular embodiment of the conformable target medium 40 to be detachably secured onto one of the walls 42 of a non-conductive structure 38 in much the same fashion that vinyl electrical tape might be applied around the surface of a plastic pipe or other structure. FIG. 7B illustrates another embodiment of the conformable target medium 40 that is formed from a thin-walled bladder 50 of a plastic material (such as polyvinyl chloride) that has been filled with a liquid target medium 52. The liquid target medium 52 may be a colloidal suspension of ferromagnetic particles in a liquid such as water or kerosene (known as ferrofluid in the chemical arts) or a liquid metal as mercury. While the bladder-embodiment of the conformable target medium 40 illustrated in FIG. 7B requires an external means of support in order to affix it into position against a wall of a non-conductive structure, it is well suited for the dimensional measuring of delicate structures which could not withstand the tensile forces involved in pulling off the tape-like embodiment of the conformable target medium 40 illustrated in FIG. 7A.

Figure 8:
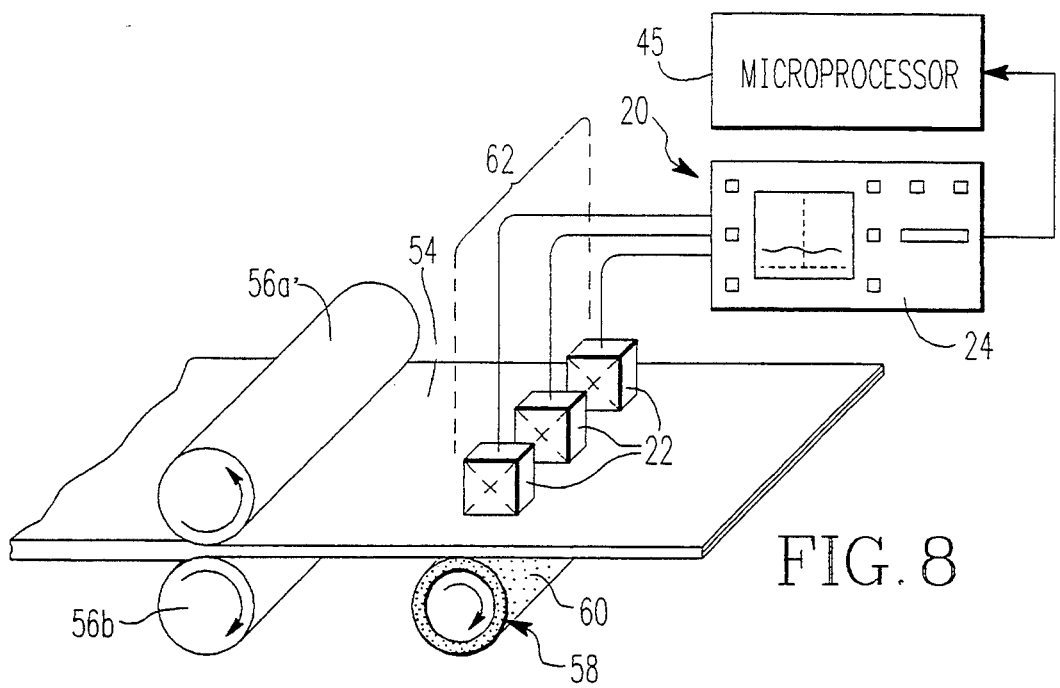
FIG. 8 is a schematic, perspective view illustrating an embodiment of the system of the invention that is well adapted for monitoring the thickness of a sheet material that is formed between the nip of a pair of opposing rollers.
Figure 9:
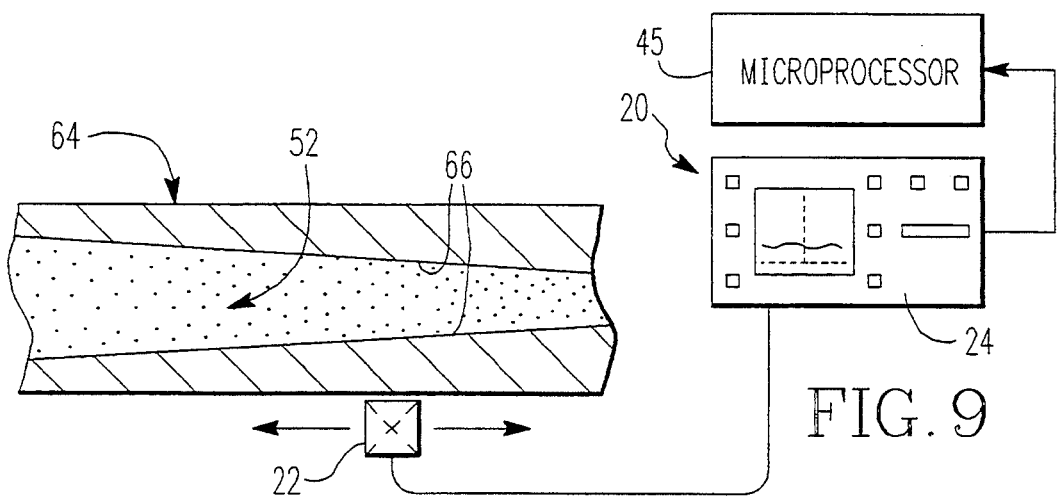
FIG. 9 illustrates how the system and method of the invention may be used to measure the varying thickness of a non-magnetic metallic tube whose inner walls are tapered by means of a magnetic liquid target medium.

Further embodiments of the system and method of the invention are illustrated in FIGS. 8 and 9, wherein the conformable target medium 40 assumes the form of a target roller 58, and a freely flowing liquid 52. The embodiment of the system illustrated in Figure 8 is particularly well adapted for measuring variations in the thickness of a sheet material 54 that is extruded between the nip of a pair of opposing rollers 56a,b. The previously-mentioned target roller 58 intimately contacts one side of the finished sheet material 54, while a battery 62 of eddy current probe coils 22 wipingly engages the other side of the extruded sheet material 54 directly opposite from the target roller 58. The exterior of the target roller 58 is covered with a resilient foam, rubber or elastomer which has been impregnated with the previously mentioned ferromagnetic particles in approximately the same concentration as the previously discussed target medium 11 formed from a polyethylene strip 13. The resilient nature of the target material 60 that forms the exterior surface of the roller 58 allows it to maintain intimate contact with the underside of the extruded sheet material 54 despite any local variations in the thickness or surface texture of this sheet material 54. Additionally, the use of a battery 62 of eddy current probe coils 22 allows the eddy current probe assembly 20 to accurately monitor variations in the thickness of the extruded sheet material 54 at all points across its width.

Figure 10:
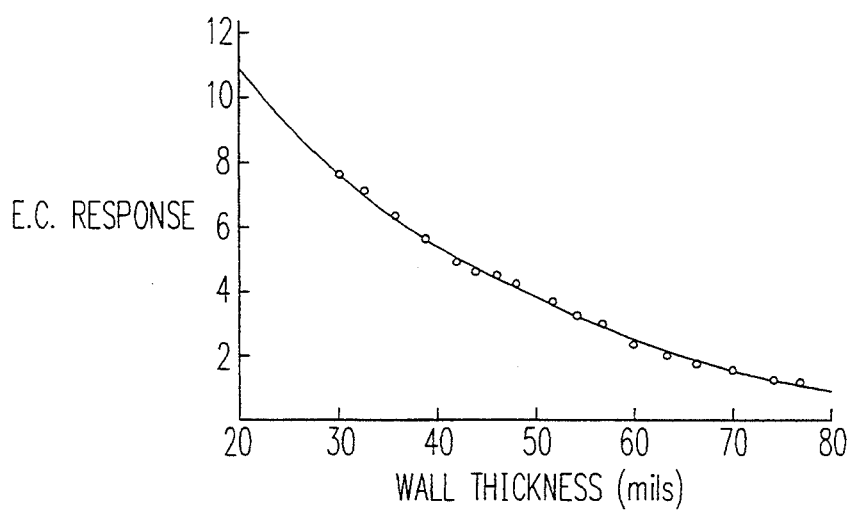
FIG. 10 illustrates the output of the eddy current probe assembly used in the embodiment of the system illustrated in FIG. 9, showing how the magnitude of the response of the eddy current probe assembly varies with the thickness of the walls of the tube.

FIGS. 9 and 10 illustrate how both the system and method of the invention may be used to measure the wall thickness of a structure formed from a conductive, but non-magnetic material such as the Zircaloy ® tubing 64 used in nuclear fuel assemblies. Such tubing 64 includes opposing, tapered walls 66 in its interior. Due to the ten foot lengths of such tubes 64, and their relative small internal diameters (which may be as little as 0.25 inches) it is impossible to accurately measure the varying wall thickness by ultrasonic probes, since the narrow inner diameter does not permit sufficient control of the orientation of the interrogating sound beam. Moreover, even though the walls 66 of such tubing 64 are electrically conductive, it is difficult if not impossible to utilize eddy current probes to accurately measure the thickness of these walls due to the fact that the conductivity of the wall 66 may change along the ten foot length of the tube 64 as a result of differences in the orientation of the zirconium crystals in these walls. By contrast, the thickness of the tapered walls 66 is easily measured by both the system and method of the invention by first filling the interior diameter of the tube 64 with a liquid target medium 52 which contains fine particles of a ferromagnetic material that interacts strongly with the fluctuating electromagnetic field emanated by the probe coil 22 of the eddy current probe assembly 20. In the method of the invention implemented by this particular system, the eddy current probe assembly 20 is first calibrated by measuring the specific magnitude of the eddy current response for specific distances between the probe coil 22, and a volume of liquid target medium 52 having precisely the same physical and electromagnetic properties as the liquid target medium 52 which fills the inner diameter of the tube 64. Next, the probe coil 22 is scanned along the longitudinal axis of the tube as is schematically illustrated in FIG. 9. As the thickness of the opposing wall 66 increases, the eddy current response diminishes as is graphically illustrated in FIG. 10. In the final steps of this method, the magnitude of the measured eddy current responses are converted into measured wall thicknesses by the microprocessor 45, and these wall thicknesses are associated with specific coordinates along the longitudinal axis of the tube 64. In this manner, the method of the invention is capable of determining whether such Zircaloy ® tubes 64 are fit for use in such important applications as nuclear fuel assemblies. Of course, the invention may be similarly applied to measure the dimensions of any structure made from a conductive but non-magnetic material.

We claim:

1. A system for measuring the distance between two opposing walls of a structure formed from a non-magnetic material, comprising:
    1) a portable, conformable, and integrally formed target medium means having a surface for conformingly engaging a surface of a wall of said structure to follow contours in said wall and which includes adhesive means for engaging said surface of said target medium means to said surface of said wall, and particles of a ferromagnetic material impregnated in a solid, non-conductive material that strongly interact with a fluctuating electromagnetic field, wherein each portion of said target medium means interacts with said field a known magnitude for a given distance, and
    2) an eddy current probe means movable into abutment against an opposing wall of said structure for generating a fluctuating electromagnetic field and detecting the magnitude of the interaction between said field and said target medium means so that the distance between said opposing walls of said structure can be determined.

2. A system for measuring the distance between two opposing walls of a structure formed from a non-magnetic material, comprising:
    1) a portable and conformable target medium means having a surface for abuttingly conforming to a wall of said structure to follow contours in said wall and which includes means for affixing substantially every point on the surface of said target medium means to a point on a surface of a wall of said structure, and particles of a ferromagnetic material impregnated in a solid, non-conductive material that strongly interact with a fluctuating electromagnetic field, wherein each portion of said target medium means interacts with said field a known magnitude for a given distance, and
    2) an eddy current probe means movable into abutment against an opposing wall of said structure for generating a fluctuating electromagnetic field and detecting said target medium means so that the distance between said opposing walls of said structure can be determined.

3. A system as defined in claim 2, wherein said target medium means is a section of sheet material sufficiently flexible to follow and abut against the contours of a wall of said structure and wherein said affixing means includes an adhesive on one side for detachably securing said material along the contours of said wall structure.

4. A method for measuring the distance between two opposing walls of a structure formed from a non-magnetic material by means of a portable, conformable and integrally formed target medium means that includes particles of a ferromagnetic material impregnated in a solid, non-conductive material that strongly interact with a fluctuating electromagnetic field; wherein each portion of said target medium means interacts with said field a known magnitude for a given distance, and an eddy current probe means movable into abutment against a wall of said structure that generates a fluctuating electromagnetic field, comprising the steps of:
    adhering a surface of said portable, conformable target medium means against a surface of a wall of said structure such that said target medium means follows contours in said wall;
    engaging said eddy current probe means on an opposing wall of said structure such that said fluctuating electromagnetic field generated by said probe means interacts with said particles of ferromagnetic material in said target medium means;
    monitoring the strength of the interaction between the fluctuating electromagnetic field of said probe means and said target medium means to determine the distance between said first and second walls, and removing said target medium means from said wall.

5. A method as defined in claim 4, wherein said target medium means is detachably adhered to said first wall, and further comprising the step of removing said target medium means from said first wall after said distance between said first and second walls has been determined.

6. A method as defined in claim 4, wherein said eddy current probe is slidably scanned over said second wall, and wherein the strength of said interaction is monitored as a function of the position of said scanning eddy current probe to determine the shape of said contours of said first wall.

* * * * *